(12) United States Patent
Knights et al.

(10) Patent No.: US 6,517,962 B1
(45) Date of Patent: Feb. 11, 2003

(54) FUEL CELL ANODE STRUCTURES FOR VOLTAGE REVERSAL TOLERANCE

(75) Inventors: Shanna D. Knights, Burnaby (CA); Jared L. Taylor, Davis, CA (US); David P. Wilkinson, North Vancouver (CA); David S. Wainwright, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/585,696

(22) Filed: Jun. 1, 2000

Related U.S. Application Data

(60) Provisional application No. 60/150,253, filed on Aug. 23, 1999.

(51) Int. Cl.⁷ .................................................. H01M 8/00
(52) U.S. Cl. .......................... 429/13; 429/12; 429/18; 429/19; 429/40; 429/42; 429/43; 429/44
(58) Field of Search ................................ 429/11, 12, 13, 429/18, 19, 40, 42, 43, 44

(56) References Cited

U.S. PATENT DOCUMENTS

| | | | |
|---|---|---|---|
| 3,341,366 A | | 9/1967 | Hodgdon, Jr. et al. ........ 136/86 |
| 4,834,847 A | * | 5/1989 | McIntyre ..................... 204/81 |
| 5,766,787 A | | 6/1998 | Watanabe et al. ............. 429/33 |
| 5,846,670 A | | 12/1998 | Watanabe et al. ............. 429/42 |
| 5,945,231 A | | 8/1999 | Narayanan et al. ........... 429/30 |
| 6,010,798 A | * | 1/2000 | Hammerschmidt et al. ... 429/30 |
| 6,074,773 A | * | 6/2000 | Wilkinson et al. ............ 429/41 |
| 6,103,077 A | * | 8/2000 | DeMarinis et al. .... 204/209.07 |
| 6,167,721 B1 | * | 1/2001 | Tsenter ......................... 62/480 |
| 6,326,098 B1 | * | 12/2001 | Itoh et al. ..................... 429/33 |

FOREIGN PATENT DOCUMENTS

| | | |
|---|---|---|
| EP | 0 443 230 | 8/1994 |
| EP | 0 716 463 | 11/1995 |
| EP | 0 872 906 | 10/2000 |
| GB | 2 309 230 | 7/1997 |
| JP | 11-067224 | 3/1999 |
| WO | WO 98/39809 | 11/1998 |

OTHER PUBLICATIONS

Savadogo, "New Materials for Water Electrolysis and Photoelectrolysis," *Hydrogen Energy World Conference*, pp. 2065–2092 (1996).

"Regenerative Fuel Cell Subsystems," *Electrochemistry Course 869 at Simon Fraser University*, pp. 1–12 (Nov. 1996).

\* cited by examiner

*Primary Examiner*—Carol Chaney
*Assistant Examiner*—Dah-Wei D. Yuan
(74) *Attorney, Agent, or Firm*—McAndrews, Held & Malloy, Ltd.

(57) ABSTRACT

In a solid polymer fuel cell series, various circumstances can result in a fuel cell being driven into voltage reversal by other cells in the series stack. For instance, cell voltage reversal can occur if that cell receives an inadequate supply of fuel (for example, fuel starvation). In order to pass current during fuel starvation, reactions other than fuel oxidation may take place at the fuel cell anode, including water electrolysis and oxidation of anode components. The latter may result in significant degradation of the anode. Such fuel cells can be made more tolerant to cell reversal by promoting water electrolysis over anode component oxidation at the anode. This can be accomplished by enhancing the presence of water in the anode catalyst layer through modifications to the anode structure or anode composition near or in the catalyst layer. For instance, water electrolysis during voltage reversal is promoted through the use of different or additional ionomer, polytetrafluoroethylene, or graphite in the anode catalyst layer, or through the use of certain sublayers between the anode catalyst layer and the anode substrate.

16 Claims, 8 Drawing Sheets

FUEL CELL ANODE STRUCTURES FOR VOLTAGE REVERSAL TOLERANCE

CROSS-REFERENCE TO RELATED APPLICATION

This application relates to and claims priority benefits from U.S. Provisional Patent Application Ser. No. 60/150,253 filed Aug. 23, 1999, which is incorporated by reference herein in its entirety.

FIELD OF THE INVENTION

The present invention relates to solid polymer fuel cells that are rendered more tolerant to voltage reversal through modifications to the anode structure near or in the catalyst layer.

BACKGROUND OF THE INVENTION

Fuel cell systems are currently being developed for use as power supplies in numerous applications, such as automobiles and stationary power plants. Such systems offer promise of economically delivering power with environmental and other benefits. To be commercially viable however, fuel cell systems need to exhibit adequate reliability in operation, even when the fuel cells are subjected to conditions outside the preferred operating range.

Fuel cells convert reactants, namely fuel and oxidant, to generate electric power and reaction products. Fuel cells generally employ an electrolyte disposed between two electrodes, namely a cathode and an anode. A catalyst typically induces the desired electrochemical reactions at the electrodes. Preferred fuel cell types include solid polymer electrolyte fuel cells that comprise a solid polymer electrolyte and operate at relatively low temperatures.

A broad range of reactants can be used in solid polymer electrolyte fuel cells. For example, the fuel stream may be substantially pure hydrogen gas, a gaseous hydrogen-containing reformate stream, or methanol in a direct methanol fuel cell. The oxidant may be, for example, substantially pure oxygen or a dilute oxygen stream such as air.

During normal operation of a solid polymer electrolyte fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The catalysts are preferably located at the interfaces between each electrode and the adjacent electrolyte.

Solid polymer electrolyte fuel cells employ a membrane electrode assembly ("MEA"), which comprises the solid polymer electrolyte or ion-exchange membrane disposed between the two electrodes. Separator plates, or flow field plates for directing the reactants across one surface of each electrode substrate, are disposed on each side of the MEA.

Each electrode contains a catalyst layer, comprising an appropriate catalyst, which is located next to the solid polymer electrolyte. The catalyst may be a metal black, an alloy or a supported metal catalyst, for example, platinum on carbon. The catalyst layer typically contains ionomer, which may be similar to that used for the solid polymer electrolyte (for example, up to 30% by weight Nafion™ brand perfluorosulfonic-based ionomer). The catalyst layer may also contain a binder, such as polytetrafluoroethylene.

The electrodes may also contain a substrate (typically a porous electrically conductive sheet material) that may be employed for purposes of reactant distribution and/or mechanical support. Optionally, the electrodes may also contain a sublayer (typically containing an electrically conductive particulate material, for example, finely comminuted carbon particles, also known as carbon black) between the catalyst layer and the substrate. A sublayer may be used to modify certain properties of the electrode (for example, interface resistance between the catalyst layer and the substrate).

Electrodes for a MEA can be prepared by first applying a sublayer, if desired, to a suitable substrate, and then applying the catalyst layer onto the sublayer. These layers can be applied in the form of slurries or inks, which contain particulates and dissolved solids mixed in a suitable liquid carrier. The liquid carrier is then evaporated off to leave a layer of particulates and dispersed solids. Cathode and anode electrodes may then be bonded to opposite sides of the membrane electrolyte via application of heat and/or pressure, or by other methods. Alternatively, catalyst layers may first be applied to the membrane electrolyte with optional sublayers and substrates incorporated thereafter, either on the catalyzed membrane or an electrode substrate.

In operation, the output voltage of an individual fuel cell under load is generally below one volt. Therefore, in order to provide greater output voltage, numerous cells are usually stacked together and are connected in series to create a higher voltage fuel cell stack. (End plate assemblies are placed at each end of the stack to hold it together and to compress the stack components together. Compressive force is needed for effecting seals and making adequate electrical contact between various stack components.) Fuel cell stacks can then be further connected in series and/or parallel combinations to form larger arrays for delivering higher voltages and/or currents.

However, fuel cells in series are potentially subject to voltage reversal, a situation in which a cell is forced to the opposite polarity by the other cells in the series. This can occur when a cell is unable to produce the current forced through it by the rest of the cells. Groups of cells within a stack can also undergo voltage reversal and even entire stacks can be driven into voltage reversal by other stacks in an array. Aside from the loss of power associated with one or more cells going into voltage reversal, this situation poses reliability concerns. Undesirable electrochemical reactions may occur, which may detrimentally affect fuel cell components. Component degradation reduces the reliability and performance of the fuel cell.

The adverse effects of voltage reversal can be prevented, for instance, by employing diodes capable of carrying the stack current across each individual fuel cell or by monitoring the voltage of each individual fuel cell and shutting down an affected stack if a low cell voltage is detected. However, given that stacks typically employ numerous fuel cells, such approaches can be quite complex and expensive to implement.

Alternatively, other conditions associated with voltage reversal may be monitored instead, and appropriate corrective action can be taken if reversal conditions are detected. For instance, a specially constructed sensor cell may be employed that is more sensitive than other fuel cells in the stack to certain conditions leading to voltage reversal (for example, fuel starvation of the stack). Thus, instead of monitoring every cell in a stack, only the sensor cell need be monitored and used to prevent widespread cell voltage reversal under such conditions. However, other conditions leading to voltage reversal may exist that a sensor cell cannot detect (for example, a defective individual cell in the stack). Another approach is to employ exhaust gas monitors that detect voltage reversal by detecting the presence of or abnormal amounts of species in an exhaust gas of a fuel cell stack that originate from reactions that occur during reversal. While exhaust gas monitors can detect a reversal condition occurring within any cell in a stack and they may suggest the cause of reversal, such monitors do not identify specific problem cells and they do not generally provide any warning of an impending voltage reversal.

Instead of or in combination with the preceding, a passive approach may be preferred such that, in the event that reversal does occur, the fuel cells are either more tolerant to the reversal or are controlled in such a way that degradation of any critical hardware is reduced. A passive approach may be particularly preferred if the conditions leading to reversal are temporary. If the cells can be made more tolerant to voltage reversal, it may not be necessary to detect for reversal and/or shut down the fuel cell system during a temporary reversal period.

SUMMARY OF THE INVENTION

During voltage reversal, electrochemical reactions may occur that result in the degradation of certain components in the affected fuel cell. Depending on the reason for the voltage reversal, there can be a rise in the absolute potential of a fuel cell anode. This can occur, for instance, when the reason is an inadequate supply of fuel (that is, fuel starvation). During such a reversal in a solid polymer fuel cell, water present at the anode may be electrolyzed. When significant water electrolysis can occur, the fuel cell voltage typically remains above about −1 V, but this voltage depends on several variables including the amount of water present, the amount of fuel present, current drawn, and temperature. It is preferred to have electrolysis occur rather than component oxidation. When water electrolysis reactions at the anode cannot keep up with the current forced through the cell, the absolute potential of the anode can rise to a point where oxidation (corrosion) of anode components takes place, thereby typically irreversibly degrading the components. Therefore, a solid polymer fuel cell can be made more tolerant to voltage reversal by increasing the amount of water available for electrolysis during reversal, thereby using the current forced through the cell in the more innocuous electrolysis of water rather than the detrimental oxidation of anode components. By increasing the amount of water in the vicinity of the anode catalyst during normal operation, more water is available at the anode catalyst in the event of a reversal. Thus, modifications to the anode structure that result in more water being present at the anode catalyst during normal operation lead to improved tolerance to voltage reversal.

In a typical solid polymer fuel cell, water generated at the cathode diffuses through the polymer membrane to the anode. By restricting the passage of this water through the anode structure and into the exhaust fuel stream, more water remains in the vicinity of the catalyst. This can be accomplished, for example, by making the anode catalyst layer or an anode sublayer impede the flow of water (either in the vapor or the liquid phase). For instance, adding a hydrophobic material such as polytetrafluoroethylene (PTFE) to either of these layers makes them more hydrophobic, thereby hindering the flow of water through the anode. Alternatively, other additives (for example, graphite, other carbon, or titanium oxide powders) may be employed that serve to reduce the porosity of either layer thereby impeding the flow of water through the anode. In certain embodiments, it may be advantageous to employ sufficient porosity reducing additive to occupy from about 0.1 to 0.2 $\mu$L volume per $cm^2$ of the anode catalyst layer. In particular, it may be advantageous to employ a porosity reducing additive comprising a mixture of polytetrafluoroethylene and acetylene carbon black in which the anode catalyst layer comprises between about 12% and 32% by weight of polytetrafluoro-ethylene and between about 0.03 and 0.2 $mg/cm^2$ of acetylene carbon black.

Another approach to increase the amount of water in the anode catalyst layer is to increase the water content in the catalyst layer components. A conventional catalyst layer for instance may contain up to 30% by weight amount of fully hydrated perfluorosulfonic ionomer with 1100 equivalent weight. Thus, an increase in water content can be accomplished by increasing the amount of the water containing ionomer used in the catalyst layer or by employing a different ionomer with higher water content (for example, trifluorostyrene, instead of perfluorosulfonic-based ionomers such as Nafion™). Alternatively, more hygroscopic materials, such as Shawinigan acetylene black carbon, may be incorporated in the anode catalyst layer to retain more water therein.

Suitable modifications to the anode structure therefore include the use of a different component or the use of a greater amount of a component, in either the catalyst layer or a sublayer, than is conventionally employed. The modification may result in a performance trade-off in another fuel cell performance characteristic, such as power density.

DETAILED DESCRIPTION OF PREFERRED EMBODIMENT(S)

Figure 1:
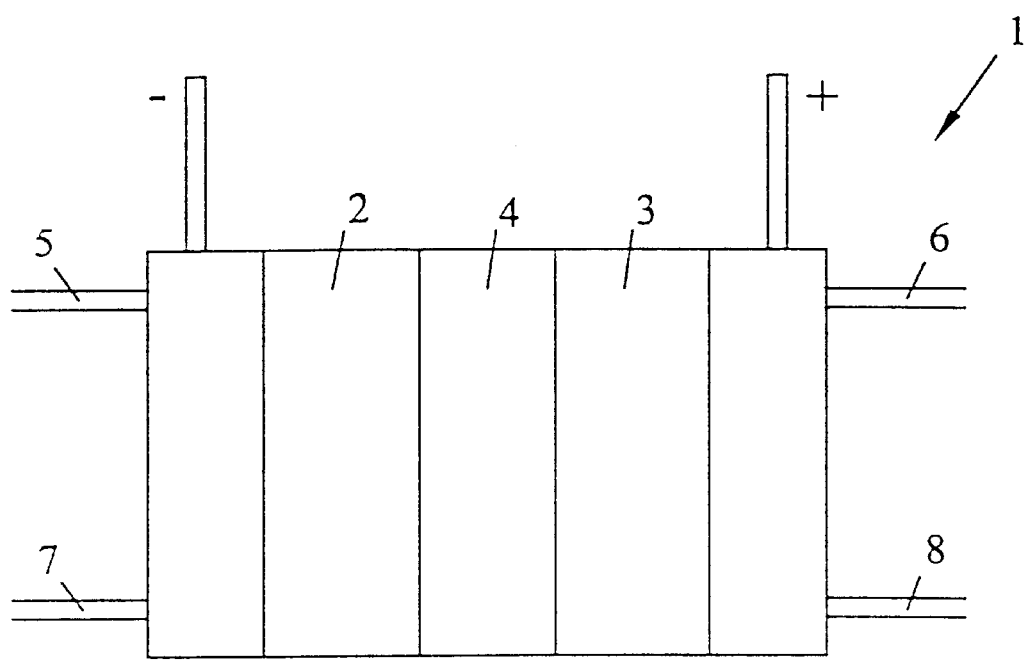
FIG. 1 is a schematic diagram of a typical solid polymer fuel cell.

Voltage reversal occurs when a fuel cell in a series stack cannot generate sufficient current to keep up with the rest of the cells in the series stack. Several conditions can lead to voltage reversal in a solid polymer fuel cell, including insufficient oxidant, insufficient fuel, insufficient water, low or high cell temperatures, and certain problems with cell components or construction. Reversal generally occurs when one or more cells experience a more extreme level of one of these conditions compared to other cells in the stack. While each of these conditions can result in negative fuel cell voltages, the mechanisms and consequences of such a reversal may differ depending on which condition caused the reversal.

During normal operation of a solid polymer fuel cell on hydrogen fuel, the following electrochemical reactions take place:

at the anode: $H_2 \rightarrow 2H^+ + 2e^-$
at the cathode: $\frac{1}{2}O_2 + 2H^+ + 2e^- \rightarrow H_2O$
overall: $H_2 + \frac{1}{2}O_2 \rightarrow H_2O$ However, with insufficient oxidant (oxygen) present, the protons produced at the anode cross the electrolyte and combine with electrons directly at the cathode to produce hydrogen gas. The anode reaction and thus the anode potential remain unchanged. However, the absolute potential of the cathode drops and the reaction is:

at the cathode, in the absence of oxygen: $2H^+ + 2e^- \rightarrow H_2$

In this case, the fuel cell is operating like a hydrogen pump. Since the oxidation of hydrogen gas and the reduction of protons are both very facile (that is, small overpotential), the voltage across the fuel cell during this type of reversal is quite small. Hydrogen production actually begins at small positive cell voltages (for example, 0.03 V) because of the large hydrogen concentration difference present in the cell. The cell voltage observed during this type of reversal depends on several factors (including the current and cell construction) but, at current densities of about 0.5 A/cm², the fuel cell voltage may typically be more than or about −0.1 V.

An insufficient oxidant condition can arise when there is water flooding in the cathode, oxidant supply problems, and the like. Such conditions then lead to low magnitude voltage reversals with hydrogen being produced at the cathode. Significant heat may also be generated in the affected cell(s). These effects raise potential reliability concerns. However, the low potential experienced at the cathode does not typically pose a significant corrosion problem for the cathode components. Nonetheless, some degradation of the membrane may occur from the lack of water production and from the heat generated during reversal. Also, the continued production of hydrogen may result in some damage to the cathode catalyst.

A different situation occurs when there is insufficient fuel present. In this case, the cathode reaction and thus the cathode potential remain unchanged. However, the anode potential rises to the potential for water electrolysis. Then, as long as water is available, electrolysis takes place at the anode. However, the potential of the anode is then generally high enough to slowly start oxidizing typical components used in the anode; for example, the carbons employed as supports for the catalyst or the electrode substrates. Thus, some anode component oxidation typically occurs along with electrolysis. (Thermodynamically, oxidation of the carbon components actually starts to occur before electrolysis. However, it has been found that electrolysis appears kinetically preferred and thus proceeds at a greater rate.) The reactions in the presence of oxidizable carbon-based components are typically:

at the anode, in the absence of fuel: $H_2O \rightarrow \frac{1}{2}O_2 + 2H^+ + 2e^-$
and
$\frac{1}{2}C + H_2O \rightarrow \frac{1}{2}CO_2 + 2H^+ + 2e^-$ More current can be sustained by the electrolysis reaction if more water is available at the anode. However, if not consumed in the electrolysis of water, current is instead used in the corrosion of the anode components. If the supply of water at the anode runs out, the anode potential rises further and the corrosion rate of the anode components increases. Thus, there is preferably an ample supply of water at the anode in order to prevent degradation of the anode components during reversal.

The voltage of a fuel cell experiencing fuel starvation is generally much lower than that of a fuel cell receiving insufficient oxidant. During reversal from fuel starvation, the cell voltage ranges around −1 V when most of the current is carried by water electrolysis. However, when electrolysis cannot sustain the current (for example, if the supply of water runs out or is inaccessible), the cell voltage can drop substantially (much less than −1 V) and is theoretically limited only by the voltage of the remaining cells in the series stack. Current is then carried by corrosion reactions of the anode components or through electrical shorts, including dielectric breakdown of the membrane electrolyte, which may develop as a result. Additionally, the cell may dry out, leading to very high ionic resistance and further heating. The impedance of the reversed cell may increase such that the cell is unable to carry the current provided by the other cells in the stack, thereby further reducing the output power provided by the stack.

Fuel starvation can arise when there is severe water flooding at the anode, fuel supply problems, and the like. Such conditions then lead to high magnitude voltage reversals (that is, much less than −1 V) with oxygen being produced at the anode. Significant heat may again be generated in the reversed cell. These effects raise more serious reliability concerns than in an oxidant starvation condition. Very high potentials may be experienced at the anode thereby posing a serious anode corrosion, and hence reliability, concern.

Voltage reversals may also originate from low fuel cell temperatures, for example at start-up. Cell performance decreases at low temperatures for kinetic, cell resistance, and mass transport limitation reasons. Voltage reversal may then occur in a cell whose temperature is lower than the others due to a temperature gradient during start-up. Reversal may also occur in a cell because of impedance differences that are amplified at lower temperatures. However, when voltage reversal is due solely to such low temperature effects, the normal reactants are still present at both the anode and cathode (unless, for example, ice has formed so as to block the flowfields). In this case, voltage reversal is caused by an increase in overpotential only. The current forced through the reversed cell still drives the normal reactions to occur and thus the aforementioned corrosion issues arising from a reactant starvation condition are less of a concern. (However, with higher anode potentials, anode components may also be oxidized.) This type of reversal is primarily a performance issue that is resolved when the stack reaches a normal operating temperature.

Problems with certain cell components and/or construction can also lead to voltage reversals. For instance, a lack of catalyst on an electrode due to manufacturing error would render a cell incapable of providing normal output current. Similarly degradation of catalyst or other component for other reasons could render a cell incapable of providing normal output current.

The present approach makes fuel cells more tolerant to voltage reversal by facilitating water electrolysis at the anode during reversal by providing sufficient water at the anode. It is thus advantageous in situations where electrolyzing more water is beneficial (for example, during a fuel starvation condition not caused by water flooding at the anode). Further, it is mainly advantageous for fuel cells operating directly on gaseous fuels. The reason for this is that liquid feed fuel cells typically employ an aqueous fuel mixture comprising an abundance of water and thus an ample supply is generally already provided to the anode during normal operation.

FIG. 1 shows a schematic diagram of a solid polymer fuel cell. Solid polymer fuel cell 1 comprises anode 2, cathode 3, and solid polymer electrolyte 4. Both anode and cathode typically employ catalysts supported on carbon powders that are mounted in turn upon carbonaceous substrates. A fuel stream is supplied at fuel inlet 5 and an oxidant stream is supplied at oxidant inlet 6. The reactant streams are exhausted at fuel and oxidant outlets 7 and 8 respectively. In the absence of fuel, water electrolysis and oxidation of carbon components in the anode may occur.

Figure 2:
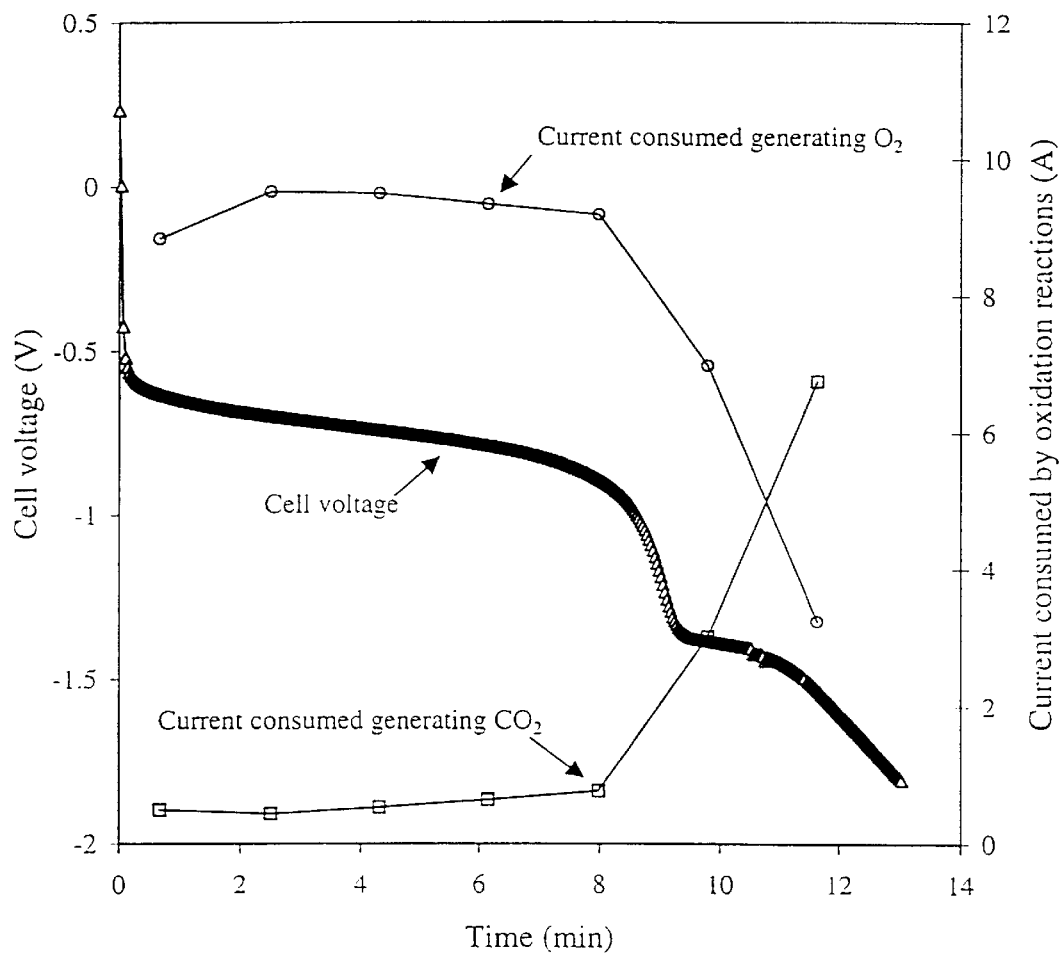
FIG. 2 is a representative plot of voltage as a function of time, as well as representative plots of the currents consumed generating oxygen and carbon dioxide as a function of time in a conventional solid polymer fuel cell undergoing fuel starvation.

FIG. 2 shows a representative voltage versus time plot of a conventional solid polymer fuel cell undergoing fuel starvation. (The fuel cell anode and cathode comprised carbon supported Pt/Ru and Pt catalysts respectively on carbon fiber paper substrates.) In this case, a stack reversal situation was simulated by using a constant current (10A) power supply to drive current through the cell and a starvation condition was created by flowing humidified nitrogen (100% relative humidity (RH)) across the anode instead of the fuel stream. In addition, the exhaust gases at the fuel outlet of this conventional fuel cell were analyzed by gas chromatography during the simulated fuel starvation. The rates at which oxygen and carbon dioxide appeared in the anode exhaust were determined and used to calculate the current consumed in producing each gas also shown in FIG. 2.

As shown in FIG. 2, the cell quickly went into reversal and dropped to a voltage of about −0.6V. The cell voltage was then roughly stable for about 8 minutes, with only a slight increase in anode overvoltage with time. During this period, most of the current was consumed in the generation of oxygen via electrolysis ($H_2O \rightarrow \frac{1}{2}O_2 + 2H^+ + 2e^-$). A small amount of current was consumed in the generation of carbon dioxide ($\frac{1}{2}C + H_2O \rightarrow \frac{1}{2}CO_2 + 2H^+ + 2e^-$). The electrolysis reaction thus sustained most of the reversal current during this period at a rough voltage plateau from about −0.6 to −0.9 V. At that point, it appeared that electrolysis could no longer sustain the current and the cell voltage dropped abruptly to about −1.4 V. Another voltage plateau developed briefly, lasting about 2 minutes. During this period, the amount of current consumed in the generation of carbon dioxide increased rapidly, while the amount of current consumed in the generation of oxygen decreased rapidly. On this second voltage plateau therefore, significantly more carbon was oxidized in the anode than on the first voltage plateau. After about 11 minutes, the cell voltage dropped off quickly again. Typically thereafter, the cell voltage continued to fall rapidly to very negative voltages (not shown) until an internal electrical short developed in the fuel cell (representing a complete cell failure). Herein, the inflection point at the end of the first voltage plateau is considered as indicating the end of the electrolysis period. The inflection point at the end of the second plateau is considered as indicating the point beyond which complete cell failure can be expected.

Without being bound by theory, the electrolysis reaction observed at cell voltages between about −0.6 V and −0.9 V is presumed to occur because there is water present at the anode catalyst and the catalyst is electrochemically reactive for electrolysis. The end of the electrolysis plateau in FIG. 2 may indicate an exhaustion of water in the vicinity of the catalyst or loss of catalyst activity (for example, by loss of electrical contact to some extent). The reactions occurring at cell voltages of about −1.4 V would presumably require water (or some other source of oxygen) to be present in the vicinity of anode carbon material without being in the vicinity of, or at least accessible to, active catalyst (otherwise electrolysis would be expected to occur instead). The internal shorts that develop after prolonged reversal to very negative voltages appear to stem from severe local heating which occurs inside the membrane electrode assembly, which may melt the polymer electrolyte, and create holes that allow the anode and cathode electrodes to touch.

In practice, a minor adverse effect on fuel cell performance may be expected after the cell has been driven into the electrolysis regime during voltage reversal (that is, driven onto the first voltage plateau). For instance, a 50 mV drop may be observed in subsequent output voltage at a given current for a fuel cell using carbon-supported anode catalyst. (It has been found however that fuel cells using unsupported anode catalysts, for example platinum blacks, are less degraded when subjected to cell reversal.) More of an adverse effect on subsequent fuel cell performance (for example, 150 mV drop) will likely occur after the cell has been driven into reversal onto the second voltage plateau. Beyond that, complete cell failure can be expected as a result of internal shorting. Thus, if a cell is going to be subjected to a voltage reversal situation, it is preferable to extend the period of electrolysis, thereby making it less likely that the cell will be exposed to more serious reversal conditions. In turn, it therefore seems preferable to enhance the amount of water present at the anode. This approach is supported by the comparison of the simulated stack reversal situations the results of which are illustrated in FIG. 3.

Figure 3:
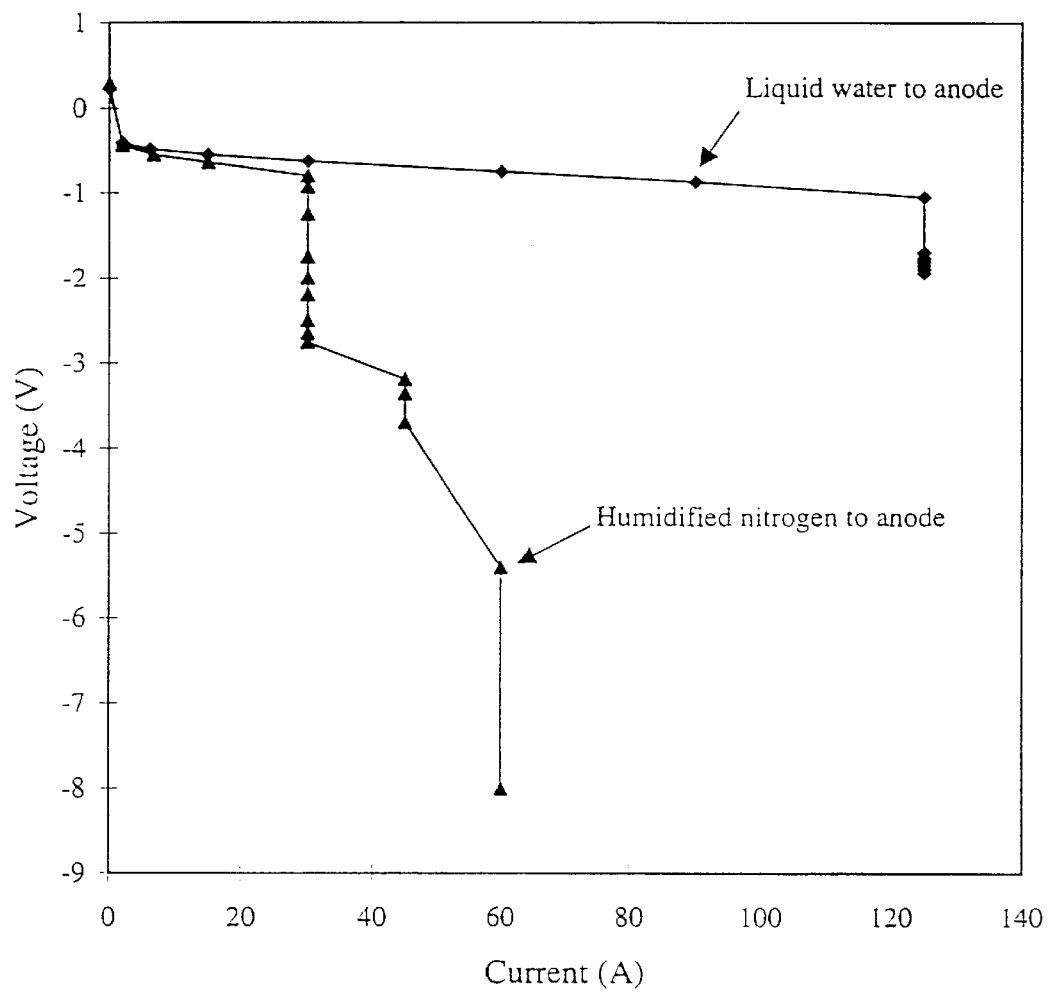
FIG. 3 is the polarization plot (voltage as a function of current) of conventional solid polymer fuel cells undergoing fuel starvation, in which the anodes were supplied with either humidified nitrogen or liquid water.

In FIG. 3, two conventional solid polymer fuel cells were subjected to fuel starvation as before except that humidified, 100% RH (relative humidity), nitrogen was supplied to the anode of one cell while liquid water was supplied to the anode of the other. The anode of the latter therefore received an enhanced amount of water as compared to the former. FIG. 3 shows the cell voltages versus power supply current. The current was increased incrementally if it appeared that the cell was able to sustain it for a brief period (that is, if the voltage was relatively constant). The intervals between increments were thus not constant and the voltages were not steady state. Nonetheless, the fuel cell with the enhanced water supply at the anode is clearly able to sustain water electrolysis at higher reversal currents.

Enhancing the amount of water present at the anode during normal operation may thus improve the tolerance of such a fuel cell to reversals of this kind. Component and/or structural modifications may be made to the anode to obtain such an enhancement. Such modifications result in more water being present at the anode at the onset of reversal and in more water being maintained at the anode during reversal. Other alternatives may also be considered for purposes of extending the period of electrolysis during reversal. For instance, the use of catalysts with improved capability for electrolysis may be expected to be beneficial in this regard. Further, the use of carbon-supported catalysts with higher loadings (that is, with greater coverage of catalyst on the supports) may be beneficial since the additional loading may protect the support against degradation and prolong the electrolysis period. In a like manner, the use of supported catalysts with more robust supports (that is, supports that oxidize and degrade less readily, such as graphite or titanium oxide) may also be of benefit.

To extend the electrolysis period by enhancing the presence of water at the anode catalyst, a greater amount of a water-absorbing component may be employed in the vicinity of the anode catalyst. Alternatively, a different, more water absorbent component may be employed instead. Thus, a greater than conventional amount of ionomer may be used in the catalyst layer. Alternatively, an ionomer with a higher water content than the conventional Nafion™ brand perfluorosulfonic ionomer may be employed instead. Still further, a more hydrophilic carbon black additive such as Shawinigan acetylene black carbon may be employed in the catalyst layer.

There may be additional advantages associated with the use of certain carbon or other additives in the anode. First, if the additive is adjacent to a carbon substrate or to carbon particles used to support the catalyst, the additive may serve to protect the carbon substrate or supports against oxidation merely by blocking ionic access to the carbon surface. Secondly, certain carbon or other additives may oxidize more easily than the carbon substrate or supports and thus may serve as sacrificial electrode material (that is, the sacrificial additive oxidizes instead of the carbon substrate or support).

The presence of water at the anode catalyst can also be enhanced by restricting the passage of water through the anode structure. In so doing, more of the water crossing over from the cathode through the electrolyte is retained in the vicinity of the anode catalyst. Thus, adding a hydrophobic material such as polytetrafluoro-ethylene (PTFE) to either the catalyst layer, to a sublayer, or to a substrate can impede the flow of water through the anode due to a decrease in wettability of the anode and thus enhance electrolysis. Alternatively, other additives, including graphite or titanium oxide particles, or even a greater amount than usual of a conventional anode component, may be employed in order to reduce the flow of water through either layer (for example, either by reducing the porosity from the added volume of the particles or otherwise impeding flow by the shape and/or orientation of the added particles).

Again, there may be additional advantages associated with some of the aforementioned additives. A carbon substrate or any carbon particles used to support the catalyst would be expected to be less wetted by water and hence corroded less during reversal if a hydrophobic additive such as PTFE were adjacent thereto. Other additives (for example, metals) may be useful in improving heat conduction.

Of course, these approaches may be employed in certain combinations if desired in order to achieve more significant improvement. Enhanced water electrolysis will result in an increase in the length of the voltage plateau associated with electrolysis during voltage reversal, as illustrated in the following examples. These examples have been included to illustrate different embodiments and aspects of the invention but they should not be construed as limiting in any way.

EXAMPLES

Various solid polymer fuel cells were constructed to illustrate anode modifications that result in extended water electrolysis periods during voltage reversal. In all these cells, the membrane electrode assemblies employed a conventional cathode having carbon supported platinum catalyst applied to a porous carbon fiber paper substrate (TGP-090 grade from Toray), and a conventional Nafion™ solid polymer membrane. The anodes also employed a conventional carbon-supported platinum-ruthenium catalyst (Pt/Ru alloy in a weight ratio of 20/10 supported on Shawinigan carbon black) applied to a porous carbon fiber paper substrate (TGP-090 grade from Toray). A comparison cell C1 without anode modifications employed a 30% by weight Nafion™ ionomer (1100 equivalent weight) loading in the catalyst layer but no other additives. In the other cells, the anode was modified in various ways that extended water electrolysis during reversal. Cell T1 employed an anode with a greater loading of water absorbing Nafion™ ionomer, 40% by weight, in the catalyst layer. Cell T2 employed an anode with a different, more water absorbing ionomer, specifically a trifluorostyrene-based composition as described in U.S. Pat. No. 5,422,411 and having an equivalent weight of 548 grams/mole, at a loading of 30% by weight. Cell T3 employed 6%. by weight hydrophobic polytetrafluoroethylene (PTFE) with no loading of ionomer in the catalyst layer. Finally, cell T4 also employed 6% by weight hydrophobic polytetrafluoroethylene (PTFE) but with 30% by weight loading of Nafion in the catalyst layer.

Each cell was conditioned prior to voltage reversal testing by operating it normally at a current density of about 0.5 $A/cm^2$ and a temperature of approximately 75° C. During conditioning, humidified hydrogen was used as fuel and humidified air as the oxidant. The air stoichiometry (that is, the ratio of oxidant supplied to oxidant consumed in the generation of electricity) was from 1.5–2. Then, voltage reversal situations were simulated by connecting a constant current power supply across the fuel cells and replacing the fuel supply to the anode with humidified, 100% RH, nitrogen at a pressure of about 25 psig (similar to the air pressure supply). The voltage reversal testing consisted of subjecting each cell to successive 5 minute long reversal periods at 50 $mA/cm^2$ current densities with a brief (15 minute) recovery period provided between reversal periods where the cell was operated normally again.

Figure 4:
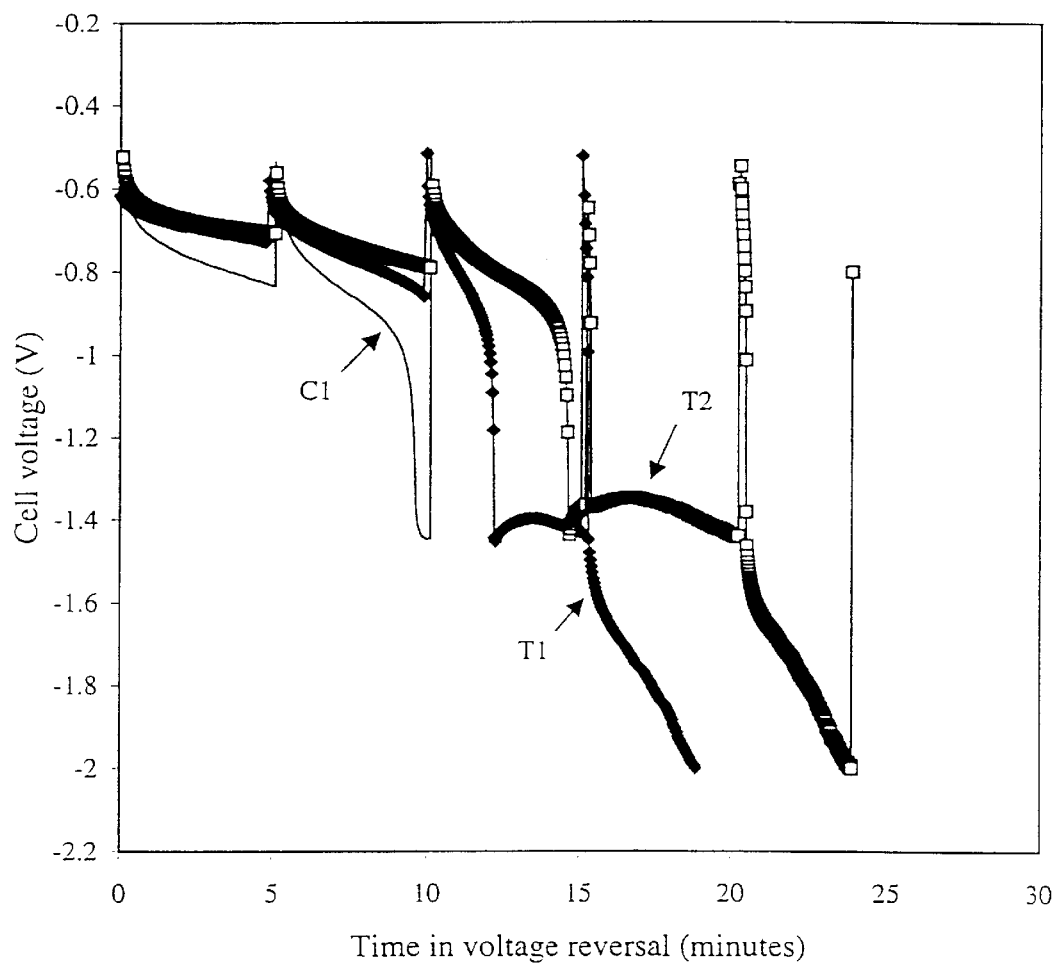
FIG. 4 is a plot of voltage as a function of time in reversal for comparison cell C1 and modified anode test cells T1 and T2 in the Examples.

FIG. 4 shows the voltage versus time in reversal for comparison cell C1 and modified anode test cells T1 and T2. In FIG. 4, the recovery periods between reversal periods are not shown. The positive spikes in the voltage curves indicate the start of the recovery periods. The cumulative electrolysis time in reversal for each cell was determined (at the approximate inflection point following the voltage plateau associated with electrolysis). The time to the point beyond which complete cell failure can be expected (the inflection point following the second voltage plateau) was also determined for cells T1 and T2. These times are summarized in the following Table. (Testing was stopped on cell C1 after the second reversal period. However, a time to complete cell failure could be estimated for the Table based on testing on previous similar cells.)

Figure 5:
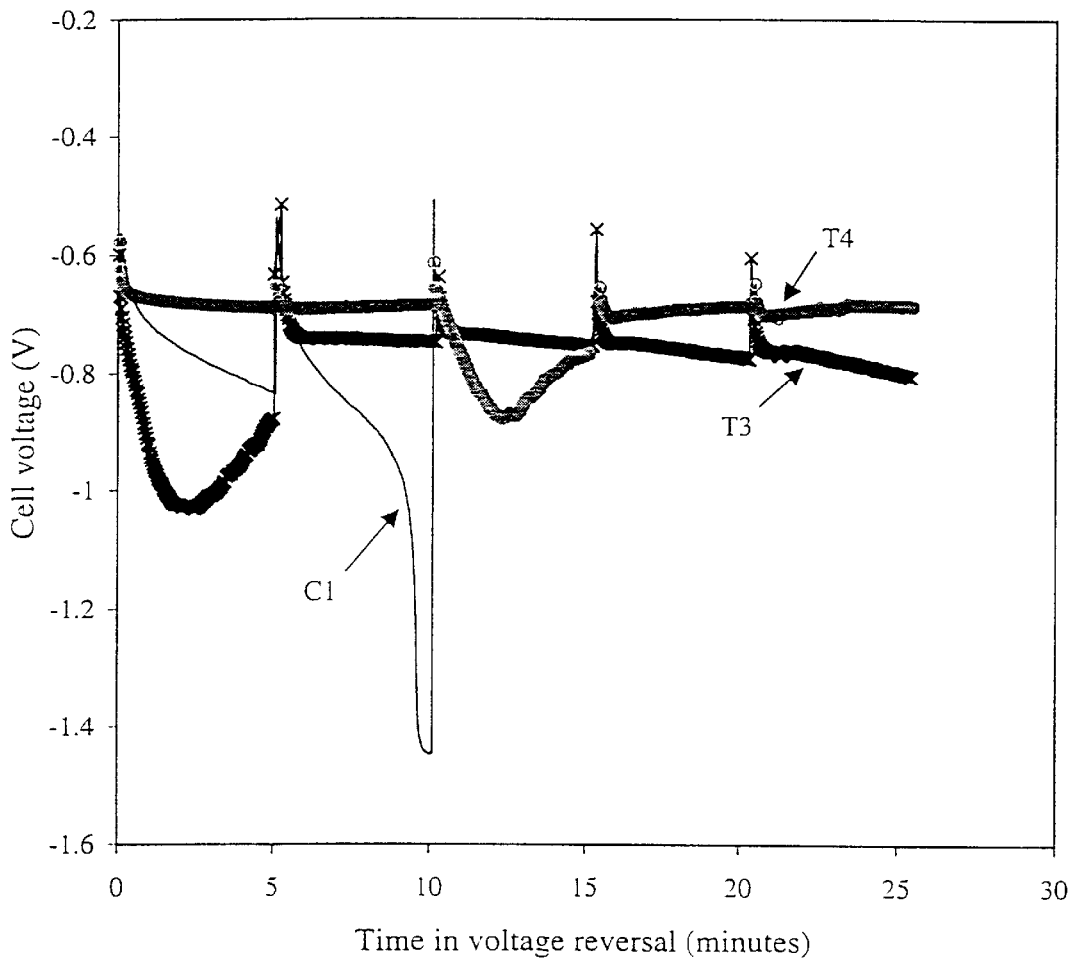
FIG. 5 is a plot of voltage as a function of time in reversal for comparison cell C1 and modified anode test cells T3 and T4 in the Examples.

In a like manner, FIG. 5 shows the voltage versus time in reversal for comparison cell C1 and modified anode test cells T3 and T4. Here, testing stopped after 25 minutes of accumulated time in reversal with both test cells, T3 and T4, still capable of electrolyzing water in reversal. The voltage of the former was noticeably degrading however. Both test cells here exhibit significant but temporary voltage drops early in the reversal testing whose cause is unknown. However, the temporary voltage drops appear to be a separate phenomenon and do not indicate a loss of electrolysis.

| Cell | Anode modification | Electrolysis period (min) | Time to complete cell failure (min) |
|------|-------------------|---------------------------|-------------------------------------|
| C1 | conventional 30% loading of Nafion ™ perfluorosulfonic-based ionomer in catalyst layer | 8 | 12 (estimate) |
| T1 | 40% loading of Nafion ™ perfluorosulfonic-based ionomer in catalyst layer | 12.5 | 18 |
| T2 | 30% loading of trifluorostyrene ionomer in catalyst layer | 14 | 24 |
| T3 | PTFE in catalyst layer, no loading of Nafion ™ perfluorosulfonic-based ionomer | >25 | >25 |
| T4 | PTFE in catalyst layer, 30% loading of Nafion ™ perfluorosulfonic-based ionomer | >25 | >25 |

As illustrated in FIGS. 4 and 5 and in the Table above, all the test cells show an increase in water electrolysis time during reversal over that of the comparison cell and thus show increased tolerance to reversal.

Several other solid polymer fuel cells were constructed to illustrate other anode modifications that result in extended electrolysis periods during voltage reversal. Another comparison cell C2 was made that was similar to test cell C1 except that the anode catalyst employed was unsupported (that is, platinum-ruthenium black) and a conventional Shawinigan carbon black sublayer was applied to the anode substrate prior to application of the catalyst layer. Test cell T5 was made in the same way except a graphite powder sublayer was applied to the anode substrate prior to application of the catalyst layer. Test cell T6 was also made in the same way except an Ebonex™ $Ti_4O_7$ powder sublayer was applied to the anode substrate prior to application of the catalyst layer.

Figure 6:
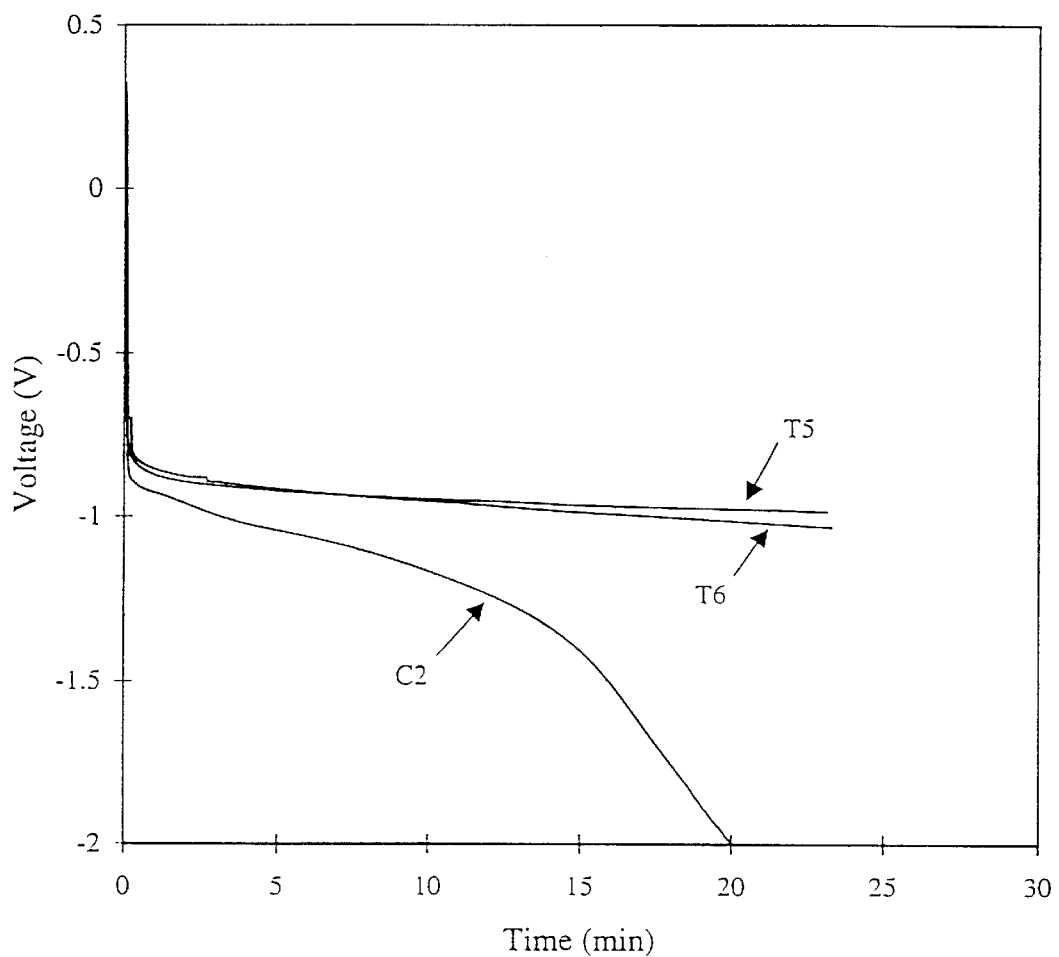
FIG. 6 is a plot of voltage as a function of time in reversal for comparison cell C2 and modified anode test cells T5 and T6 in the Examples.

Each cell was conditioned as in the preceding and was then subjected to simulated voltage reversal. Here however, the cells were subjected to only one continuous reversal period. FIG. 6 shows the cell voltage versus time in reversal for each of these cells. Both cell T5 and T6 sustained electrolysis for over 20 minutes when cell testing was stopped. Both showed a substantial increase in electrolysis time over that of the comparison cell.

Figure 7A:
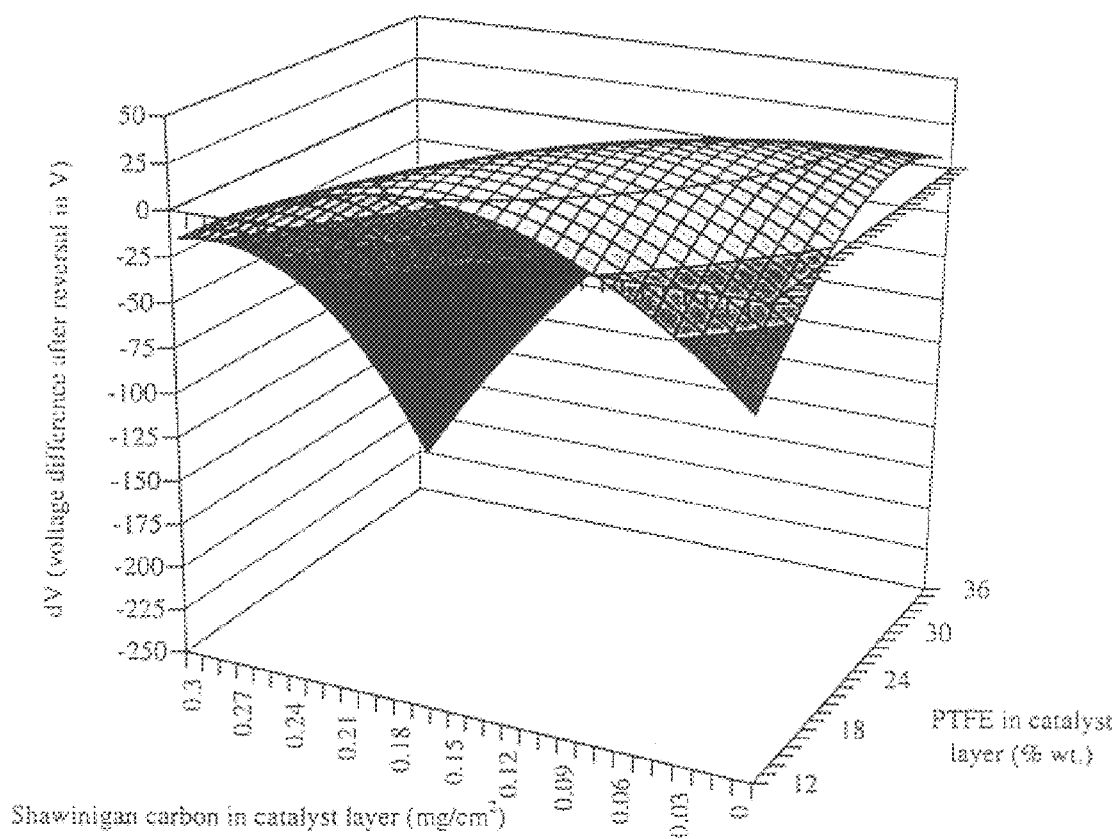
FIG. 7A is a contour plot of the voltage difference following reversal (that is, voltage after reversal minus voltage before reversal) as a function of PTFE content and of Shawinigan black content in the catalyst layer of fuel cells in the Examples.
Figure 7B:
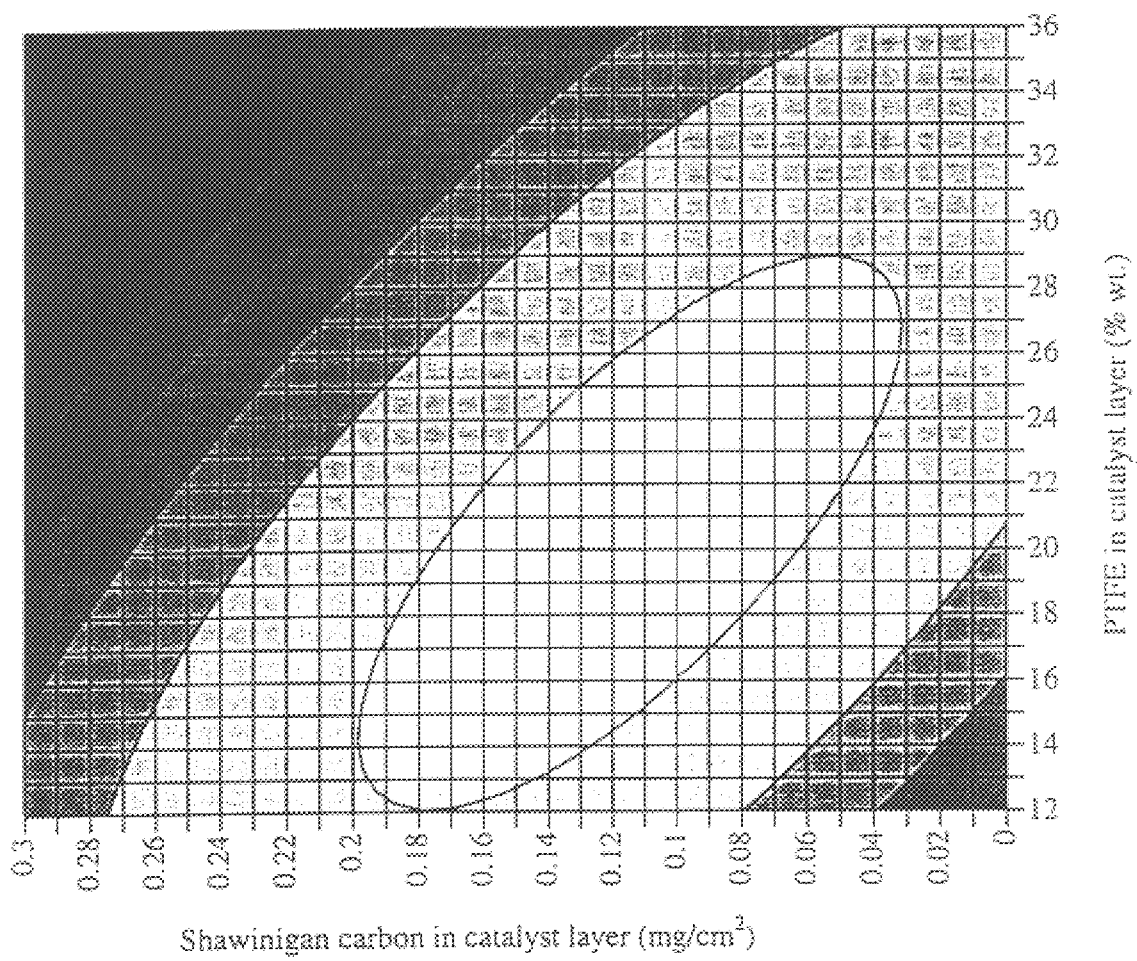
FIG. 7B is a top view of the contour plot of FIG. 7A.

Finally, a series of nine other solid polymer fuel cells was constructed to further illustrate the beneficial effects of certain additives to the anode catalyst layer on reversal tolerance. These cells had varied amounts of PTFE and of Shawinigan carbon black added to the anode catalyst layer. Three different amounts of PTFE (12, 24, and 36% by weight of the catalyst layer) were used in combinations with three different amounts of Shawinigan black (0, 0.15, and 0.3 mg/cm$^2$). (In his series, the catalyst was applied in a PTFE-based ink and a Nafion™ coating was applied afterwards.) The cells were conditioned as in the preceding and their voltages during normal operation at 800 A/cm$^2$ were measured. Each cell was then subjected to a series of ten simulated voltage reversal lasting for five minutes each at a 200 mA/cm$^2$ current density. Their voltages during subsequent normal operation at 800 A/cm$^2$ were measured again and the voltage differences (that is, voltage after reversal minus voltage before reversal) for each cell, were determined. A statistical analysis (using a Statistica™ analysis program) was performed on this data to generate the contour plot shown in FIG. 7A, which shows voltage difference, dV, as a function of PTFE and of Shawinigan black amounts in the catalyst layer. (FIG. 7B shows a top view of the contour plot of FIG. 7A.) Preferably, the cell voltage does not drop significantly after a reversal episode. In this regard, FIG. 7B shows an optimum region for the amounts of PTFE and Shawinigan black (between about 12 and 29% PTFE and about 0.03 and 0.2 mg/cm$^2$ Shawinigan black). In fact, a slight improvement (for example, a slight increase in cell voltage) is observed in the preferred region of this contour plot for reasons that are not yet completely understood.

The optimum region in FIG. 7b is roughly defined by a line connecting the points (0.04 mg Shawinigan/cm$^2$, 28% PTFE) and (0.19 mg Shawinigan/cm$^2$, 13% PTFE). In this series of fuel cells, the anode catalyst layer contained 0.75 mg/cm$^2$ of carbon supported catalyst (of which 0.15 cm$^2$ was Pt). Herein, the PTFE amount refers to percent by weight of the catalyst layer, so these points correspond to about (0.04 mg Shawinigan/cm$^2$, 0.31 mg PTFE/cm$^2$) and (0.19 mg Shawinigan/cm$^2$, 0.14 mg PTFE/cm$^2$), respectively. With the density of Shawinigan carbon black and PTFE being approximately 2.0 g/cc and 2.2 g/cc respectively, these points further correspond to (0.02 $\mu$l Shawinigan/cm$^2$, 0.14 $\mu$l PTFE/cm$^2$) and (0.095 $\mu$l Shawinigan/cm$^2$, 0.064 $\mu$l PTFE/cm$^2$) respectively. The total additive volume at each of these points is thus about the same, that is, about 0.16 $\mu$l/cm$^2$, and thus the line connecting the points represents a constant additive volume. This suggests that the optimum region may be defined to a great extent by the total volume occupied by additive, in this case between about 0.1 and 0.2 $\mu$l/cm$^2$.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of making a solid polymer electrolyte fuel cell more tolerant to voltage reversal, said fuel cell comprising a cathode, a solid polymer electrolyte, and an anode, and said anode comprising an anode substrate and an anode catalyst layer located between said substrate and said solid polymer electrolyte, wherein said method comprises decreasing the flow of water through said anode catalyst layer to said anode substrate, wherein said water flow is decreased by incorporating a porosity-reducing additive in said anode catalyst layer, wherein said porosity reducing additive occupies from about 0.1 to 0.2 $\mu$l volume per cm$^2$ of said anode catalyst layer.

2. The method of claim 1 wherein said porosity reducing additive comprises a mixture of polytetrafluoroethylene and acetylene carbon black.

3. The method of claim 1 wherein said anode catalyst layer comprises between about 12% and 32% by weight of polytetrafluoroethylene.

4. The method of claim 1 wherein said anode catalyst layer comprises between about 0.03 and 0.2 mg/cm$^2$ of acetylene carbon black.

5. A method of making a solid polymer electrolyte fuel cell more tolerant to voltage reversal, said fuel cell comprising a cathode, a solid polymer electrolyte, and an anode, and said anode comprising an anode substrate and an anode catalyst layer located between said substrate and said solid polymer electrolyte, wherein said method comprises decreasing the flow of water through said anode catalyst layer to said anode substrate, wherein said water flow is decreased by incorporating a sublayer between said anode catalyst layer and said substrate.

6. The method of claim 5 wherein said sublayer comprises graphite.

7. The method of claim 5 wherein said sublayer comprises $Ti_4O_7$.

8. A method of making a solid polymer electrolyte fuel cell more tolerant to voltage reversal, said fuel cell comprising a cathode, a solid polymer electrolyte, and an anode, and said anode comprising an anode substrate and an anode catalyst layer located between said substrate and said solid polymer electrolyte, wherein said method comprises increasing the water content in said anode catalyst layer, said method comprising increasing the water content in said anode catalyst layer to an amount greater than that contained in a layer comprising 30% by weight amount of fully hydrated perfluorosulfonic ionomer with 1100 equivalent weight and no other additives.

9. A method of making a solid polymer electrolyte fuel cell more tolerant to voltage reversal, said fuel cell comprising a cathode, a solid polymer electrolyte, and an anode, and said anode comprising an anode substrate and an anode catalyst layer located between said substrate and said solid polymer electrolyte, wherein said method comprises increasing the water content in said anode catalyst layer, wherein said water content is increased by incorporating a hygroscopic additive in said anode catalyst layer, wherein said hygroscopic additive is graphite.

10. A solid polymer electrolyte fuel cell with improved voltage reversal tolerance, said fuel cell comprising a cathode, a solid polymer electrolyte, and an anode, and said anode comprising an anode substrate and an anode catalyst layer located between said substrate and said solid polymer electrolyte, wherein said anode catalyst layer comprises between about 6% and about 32% polytetrafluoroethylene and between about 0.03 mg/cm$^2$ and about 0.2 mg/cm$^2$ of acetylene carbon black.

11. The fuel cell of claim 10 wherein said anode catalyst layer comprises between about 12% and 29% by weight of polytetrafluoroethylene and between about 0.03 mg/cm$^2$ and about 0.2 mg/cm$^2$ of acetylene carbon black.

12. A solid polymer electrolyte fuel cell with improved voltage reversal tolerance, said fuel cell comprising a cathode, a solid polymer electrolyte, and an anode, and said anode comprising an anode substrate and an anode catalyst layer located between said substrate and said solid polymer electrolyte, wherein said anode catalyst layer comprises an uncatalyzed acetylene carbon black additive.

13. The fuel cell of claim 12 wherein said anode catalyst layer comprises between about 0.03 and 0.2 mg/cm$^2$ of said uncatalyzed acetylene carbon black additive.

14. A solid polymer electrolyte fuel cell with improved voltage reversal tolerance, said fuel cell comprising a cathode, a solid polymer electrolyte, and an anode, and said anode comprising an anode substrate, an anode catalyst layer located between said substrate and said solid polymer electrolyte and a sublayer located between said anode catalyst layer and said substrate, wherein said sublayer comprises graphite or $Ti_4O_7$.

15. A solid polymer electrolyte fuel cell with improved voltage reversal tolerance, said fuel cell comprising a cathode, a solid polymer electrolyte, and an anode, and said anode comprising an anode substrate and an anode catalyst layer located between said substrate and said solid polymer electrolyte, wherein said anode catalyst layer comprises a catalyst and a carbon material that does not support said catalyst.

16. The fuel cell of claim 15 wherein said carbon material comprises between about 0.03 and 0.2 mg/cm$^2$ of acetylene carbon black.

* * * * *